(12) United States Patent
Lankinen

(10) Patent No.: US 8,181,380 B2
(45) Date of Patent: May 22, 2012

(54) ELECTRONIC FISHING DEVICE AND A RELATED SYSTEM, METHOD, AND USE

(75) Inventor: Petteri Lankinen, Espoo (FI)

(73) Assignee: Liquid Zone Oy, Parainen (FI)

( * ) Notice: Subject to any disclaimer, the term of this patent is extended or adjusted under 35 U.S.C. 154(b) by 428 days.

(21) Appl. No.: 12/473,826

(22) Filed: May 28, 2009

(65) Prior Publication Data

US 2009/0293336 A1 Dec. 3, 2009

(30) Foreign Application Priority Data

May 28, 2008 (FI) .................................... 20085503

(51) Int. Cl.
*A01K 79/02* (2006.01)
(52) U.S. Cl. .......................................... 43/17.1; 43/4.5
(58) Field of Classification Search .................. 43/17.1, 43/4.5, 4
See application file for complete search history.

(56) References Cited

U.S. PATENT DOCUMENTS

| | | | |
|---|---|---|---|
| 3,031,788 A * | 5/1962 | Shannon | 43/4 |
| 4,486,970 A | 12/1984 | Larson | |
| 4,583,313 A * | 4/1986 | Dugan, Jr. | 43/17.1 |
| 5,072,540 A * | 12/1991 | Monzyk et al. | 43/4 |
| 5,483,767 A | 1/1996 | Langer | |
| 5,511,335 A * | 4/1996 | Langer | 43/4 |
| 5,782,033 A * | 7/1998 | Park et al. | 43/4 |
| 6,091,443 A * | 7/2000 | Ford et al. | 348/81 |
| 6,658,784 B1 | 12/2003 | Mastropaolo | |
| 6,760,995 B2 | 7/2004 | Mueller | |
| 7,669,360 B2 * | 3/2010 | Davidson | 43/17 |
| 2003/0056424 A1 | 3/2003 | Mueller | |
| 2006/0191185 A1 | 8/2006 | Hansen | |

OTHER PUBLICATIONS

European Search Report in Corresponding Application No, EP 09 16 1228 dated Mar. 25, 2010.

* cited by examiner

*Primary Examiner* — Christopher P Ellis
(74) *Attorney, Agent, or Firm* — Young & Thompson (57) ABSTRACT

An electronic fishing device for facilitating trolling a fish-catching element in water and a related system, method, and use, the fishing device including: a first sensing element for obtaining a first indication relating to water temperature, a second sensing element for obtaining a second indication relating to the depth of the device, a steering member for adjusting the depth of the device, a processing unit for controlling, via the first and/or second indication provided by the first and second sensing elements, the steering member so as to guide the device relative to at least one element selected from the group consisting of: the position of the thermocline layer, a predetermined depth, and a predetermined temperature. In addition to fishing the disclosed device may be utilized in marine or other underwater research.

20 Claims, 8 Drawing Sheets

ELECTRONIC FISHING DEVICE AND A RELATED SYSTEM, METHOD, AND USE

FIELD OF THE INVENTION

This invention relates generally to fishing equipment. More particularly the present invention is directed to an electronic fishing device that may tow a lure or another element and apply information about water temperature and depth for device control purposes and optionally for determining the thermocline and seeking the right depth for desired species.

BACKGROUND OF THE INVENTION

Figure 1:
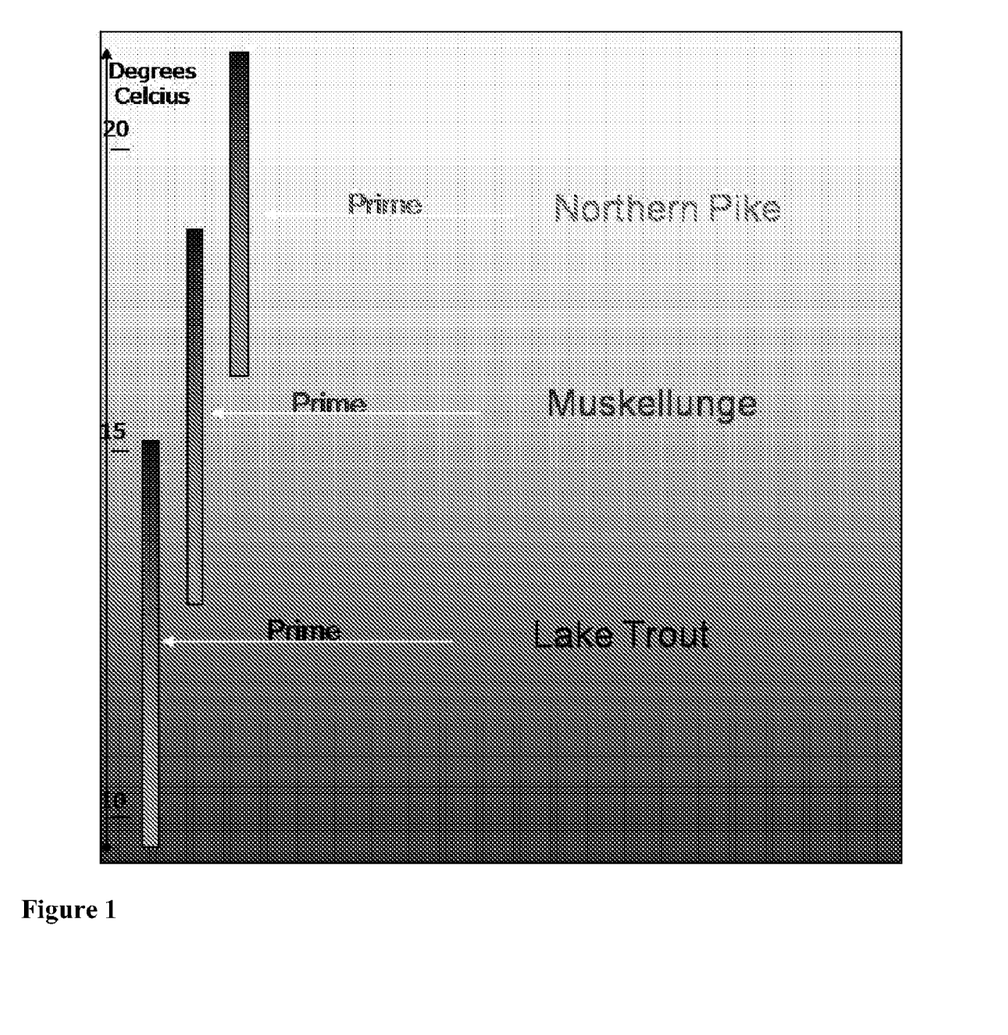
FIG. 1 illustrates depth-specific zones for different fish species.

Recreational and sport fishing has great global markets. Millions of anglers are counted throughout the world and their number is still growing. The invention described in this document relates closely to fishing with a lure or e.g. a baited hook trolled behind the boat. The number of trolling anglers in Europe, the USA and Canada is estimated to be over 40 millions. Typically, the anglers are fishing for a specific species and it is known that fish are active in varying temperatures species-specifically, as can be seen in FIG. 1, and also the richest area of various species in general may be determined.

However, while fishing for particular species, the control over the depth of the lure in water is a major problem. Typically, the means that the anglers are using for depth control is such as a downrigger, see FIG. 2 and entity 202 therein, a submersible temperature/depth transducer and monitor and a diver. Alternatively, the depth of the lure can be controlled by different lure types or by adjusting the length of the fishing line and trolling speed. A downrigger, which is bolted to the stern of a fishing vessel, consists of an electrical or mechanical reel and a short rod. The reel is filled with strong line\wire, which is attached to a lead weight. A submersible temperature/depth transducer and monitor, attached to the downrigger line instead of a conventional weight, is used for reading the temperature and speed through a coaxial cable to the LCD screen located in a boat. However, the handling of a downrigger is difficult and usually, when the fish strikes, one more person is needed to wind up the downrigger. Further, a small disk known as a diver is attached to the fishing line to make a lure dive deeper. Any of the means mentioned above are merely adapted to track a predetermined depth disregarding various other factors truly affecting the actual position of fishes. In addition, e.g. a downrigger with a submersible temperature/depth transducer and monitor is an expensive piece of equipment and yet, a depth chart is also needed. Moreover, the diver is generally not accurate and it does not offer any method of measuring the temperature in real time.

U.S. Pat. No. 6,760,995B2 discloses a submersible device for controlling the depth and the azimuth heading of the device. However, the publication mainly concentrates on the remote control part of the suggested arrangement despite the cursory disclosure of sensors for sensing the characteristics of the underwater environment.

Thus the objective of the present invention is to at least alleviate the aforesaid defects of prior art solutions when it comes to the usability and fish tracking capability thereof.

SUMMARY OF THE INVENTION

The objective is met by an electronic fishing device, hereafter also referred as "the device", which may be configured to track a predetermined depth, a predetermined temperature and/or the thermocline, and in connection with thermocline tracking, preferably configured to remain therein or on a predetermined level relative thereto.

Accordingly, in one aspect of the present invention an electronic fishing device for facilitating trolling a fish-catching element in water comprises:

a first sensing means for obtaining a first indication relating to water temperature, a second sensing means for obtaining a second indication relating to the depth of the device, a steering means for adjusting the depth of the device, and a processing means for controlling, via said first and/or second indication provided by said first and second sensing means, the steering means so as to guide the device relative to at least one element selected from the group consisting of: the position of the thermocline layer, a predetermined depth, and a predetermined temperature.

In an embodiment of the present invention a system comprising the above electronic fishing device is characterized by at least one further element being designed as remote therefrom, when in use, and selected from the group consisting of: a remote controller, a data analyzer, a data forwarding entity, and a data storage.

In another aspect of the present invention is provided a method of fishing by using the electronic fishing device or the system.

Yet a further aspect of the present invention includes the use of the electronic fishing device or the system in marine or other underwater research.

In one embodiment the device may be controlled to gravitate towards and reside within the thermocline in general, or to maintain a certain level or layer inside or at least relative, e.g. within a predetermined distance according to predetermined or adaptive criteria, to the thermocline. The processing means may be thus configured to determine, via said first and second indications provided by said first and second sensing means, the position of the thermocline layer so as to control the steering means to guide the device relative to the thermocline layer.

In another aspect, the aforesaid device is used in marine or other type of underwater research as to be described in more detail hereinafter.

The device further optionally comprises a data transfer means for changing the settings of the device while or prior to/after using it, or for other remote control, e.g. steering, purposes, a remote device means for e.g. remote storage, management, processing, transfer, or analysis of the information sent by the device and/or for transmitting distant control data towards the device. The device may also comprise a memory means such as one or more memories for e.g. preprogrammed routines and/or for storing of e.g. the temperature and/or the depth data as well as the data from the optional sensors for future reference, a bottom detection means, e.g. one or multiple sensors, for preventing the device or the lure to hit the bottom of sea or a lake, a light intensity measuring means, e.g. one or multiple sensors, for detecting the lightness circumstances, a camera for the real time monitoring of the device and a velocity measuring means, e.g. one or multiple sensors, for detecting the trolling speed, for instance. The aforementioned means may alternatively or additionally be used for other purposes. Yet, the device may comprise a position adjustment means such as a hydrofoil of preferred shape, size, material, and/or optionally color. One or more elements of the device may be embedded at least partly in a body portion that may be of substantially cylindrical shape, for instance.

The processing means may refer to one or more electronic elements such as (micro)processors, microcontrollers, digital signal processors (DSPs), programmable logic chips, or any desired combination thereof.

Likewise, the first sensing means for obtaining a first indication of water (or generally surrounding liquid) temperature may refer e.g. to one or more electronic sensor elements such as thermistors, thermocouples, RTDs, or a combination thereof.

Respectively, the second sensing means for obtaining a second indication of (device) depth may refer e.g. to one or more electronic sensor elements such as pressure sensors implemented with semiconductor piezoresistive or microelectromechanical systems technique, for example.

Further, a storage means may refer to non-volatile memory, such as PROM, EEPROM or flash memory, for instance. Also volatile memory such as RAM may be included.

The data (e.g. control or other, e.g. measurement, data) transfer means may be implemented by using sound waves, i.e. a sonic data link, and/or by sending pulses along the fishing line. The remote device means may be implemented accordingly to enable co-operation, i.e. one or two-way information transfer, with the data transfer means of the device. Use of both the data transfer means (in connection with the electronic fishing device) and the remote device means (residing elsewhere, e.g. on a boat or ship towing the device) preferably enables two-way communication between the device and the user. Both the aforesaid means may include processing and/or memory means in addition to communication means such as a transmitter, a receiver, or a transceiver.

In addition, a bottom detection means may be implemented with e.g. echo sounder or ultra sound, or the detection of the bottom may also be implemented inductively.

In different embodiments, the device may have independent steering and the device may track the thermocline by scanning the area and calculating the limits. In some embodiments, the device may also have a sideways trim or a sideways control used to direct the device more to alongside with the trolling vessel, for instance. In addition, some embodiments may arrange the devices for shallow or deep water, or the device may be castable. The other embodiments may include a combination of any of the characteristics mentioned above.

The utility of the invention is based on multiple issues. First, the provided device is simple to use and manufacture, affordable, small in size, light, and versatile. The device is feasible for both shallow and deep water and it is practical with both slow and faster towing speeds. Tracking the thermocline by using e.g. the temperature gradient, instead of simple temperature and/or pressure sensing, provides a more accurate method of locating the wanted species. The thermocline typically contains more fishes than the surrounding other layers, which makes tracking thereof desirable in trolling. Preferred species may be further monitored by temperature-based tracking.

The thermocline (see FIG. 3 for illustrative example) is generally a designation for a specific layer in a lake or sea. The determination of the thermocline can be based on the temperature and it can be detected by monitoring the drop of the water temperature with depth, e.g. the gradient of the temperature as a function of depth. The range of the water temperature in the thermocline is often approximately 4° C.-10° C. and the thickness of the thermocline can considerably vary from only few meters to e.g. a hundred meters in tropic. For example, the place and the thickness of the thermocline may typically vary with latitude and season. E.g. in Finland the thermocline is strongest during the summer when the difference between the temperature of the surface water and the bottom water is widest and nonexistent during the winter when the water in the sea and lakes is cold from the surface to the bottom. Instead, the thermocline is permanent in the tropics throughout the year. It is believed that the thermocline prevents the warm surface water from mixing with the cold bottom water and thus oxygen, nutrient and other substances are isolated into it. As a result, fish gravitate towards the thermocline after nourishment.

Further, the configurable and adjustable device for various circumstances in accordance with an embodiment of the present invention may be achieved by using repairable and/or replaceable parts defining e.g. different sizes, shapes and/or colors of the hydrofoil and the front fins, for instance. Further, additional features may be purchased or otherwise obtained (e.g. user-made). Optionally, the device may have extension/ additional slots or corresponding locations or fasteners e.g. for electronic and/or mechanical supplementary components such as extra sensors or components related to the programmability or fishing, for example.

Various embodiments are disclosed in the attached dependent claims.

BRIEF DESCRIPTION OF THE DRAWINGS

Next the invention will be described in more detail with reference to the following drawings.

DETAILED DESCRIPTION OF THE EMBODIMENTS

Figure 2:
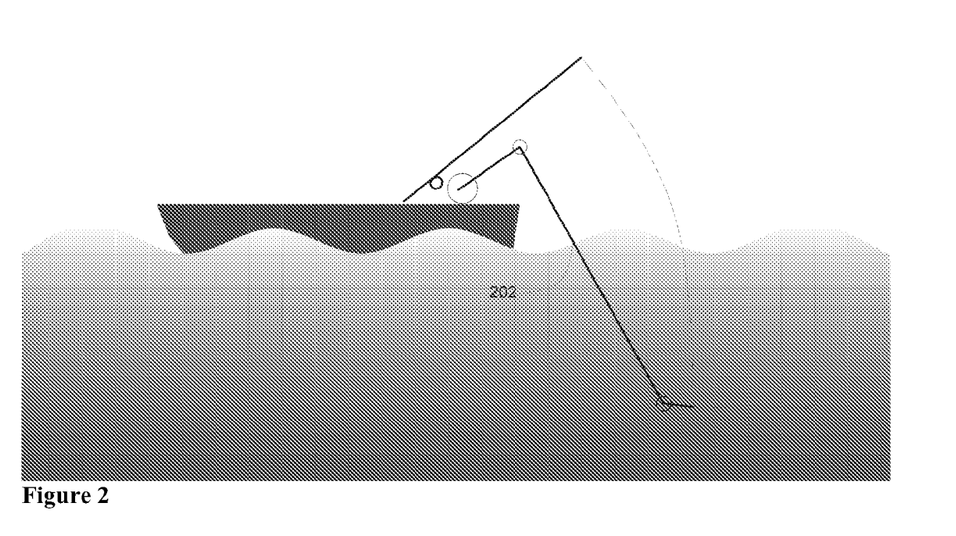
FIG. 2 discloses shortcomings of a prior art downrigger solution.
Figure 3:
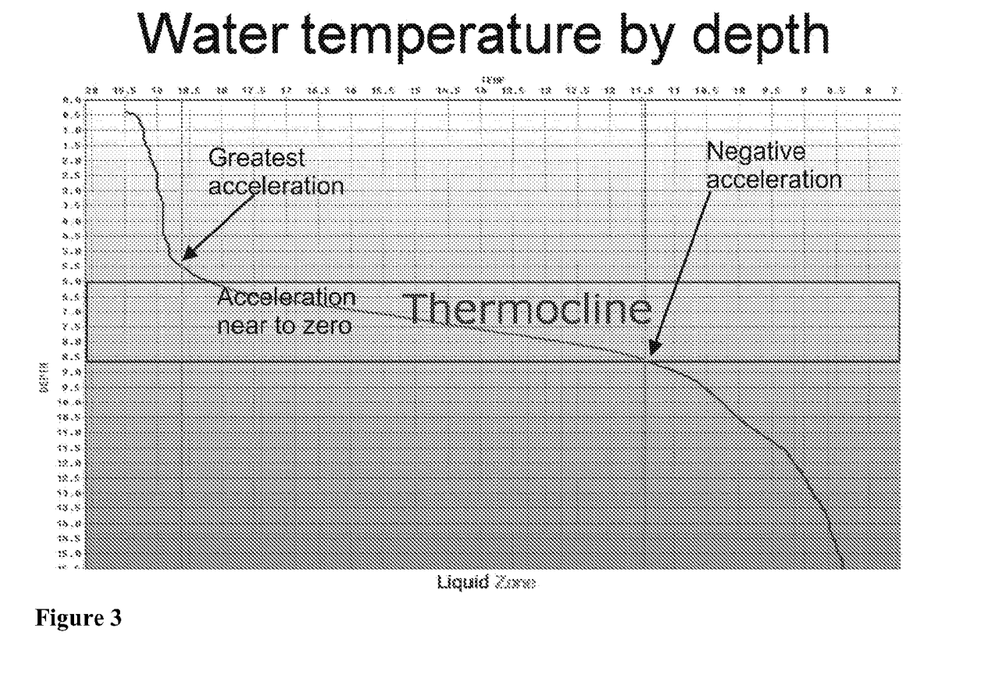
FIG. 3 illustrates a position of an exemplary thermocline in relation to the water temperature and depth.

FIGS. 1-3 have already been reviewed in connection with introducing the background and summary of the invention.

Figure 4A:
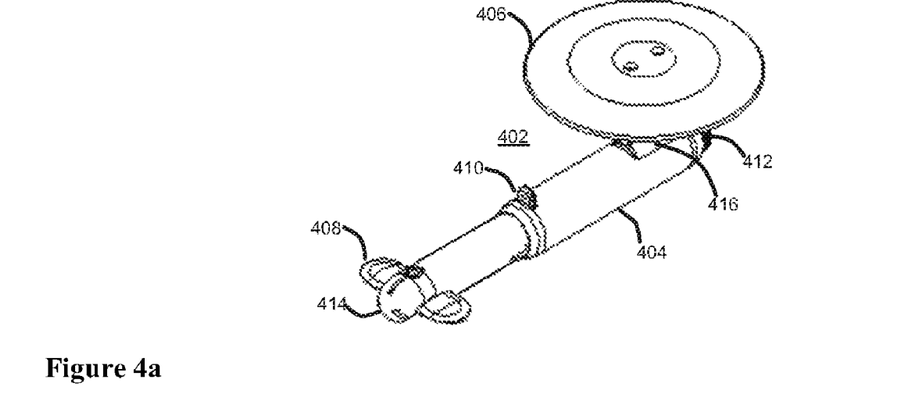
FIG. 4a illustrates an isometric view of one embodiment of an electronic fishing device in accordance with the present invention.

FIG. 4a illustrates a perspective view of one embodiment of an electronic fishing (aid) device in accordance with the present invention. The submersible device 402 comprises a control body 404, a hydrofoil 406 preferably assembled on the rear end of the control body 404, front fins 408 assembled in both of the front sides of the control body 404, a preferably adjustable towing/trolling point 410 with e.g. a hook, a ring, a projection, etc, on the front top of the control body 404, and a connection point, e.g. a hook or ring etc, for a lure 412 in the rear end of the control body 404. Although FIG. 4 provides one configuration, it should be understood that the device 402 may be in wide variety of sides, shapes and colors although the functionality of the equipment carried by the device 402 remains substantially the same.

Figure 4B:
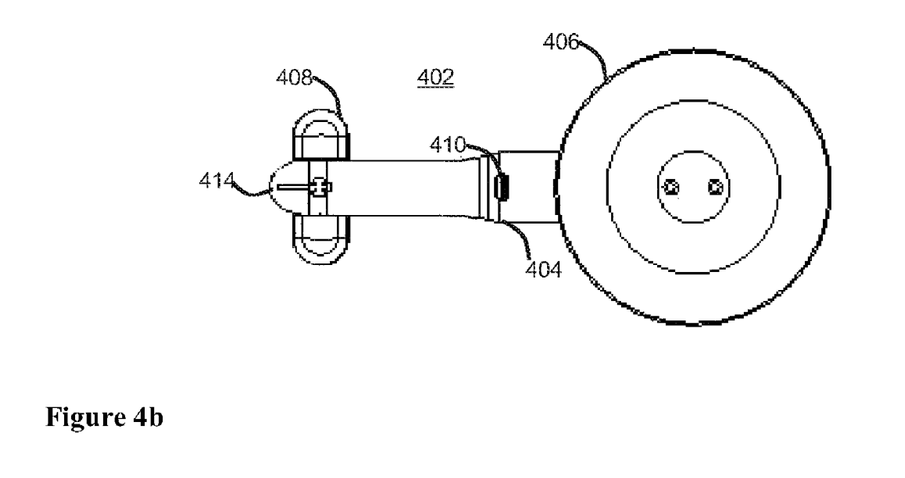
FIG. 4b illustrates a top view of one embodiment of an electronic fishing device in accordance with the present invention.
Figure 4C:
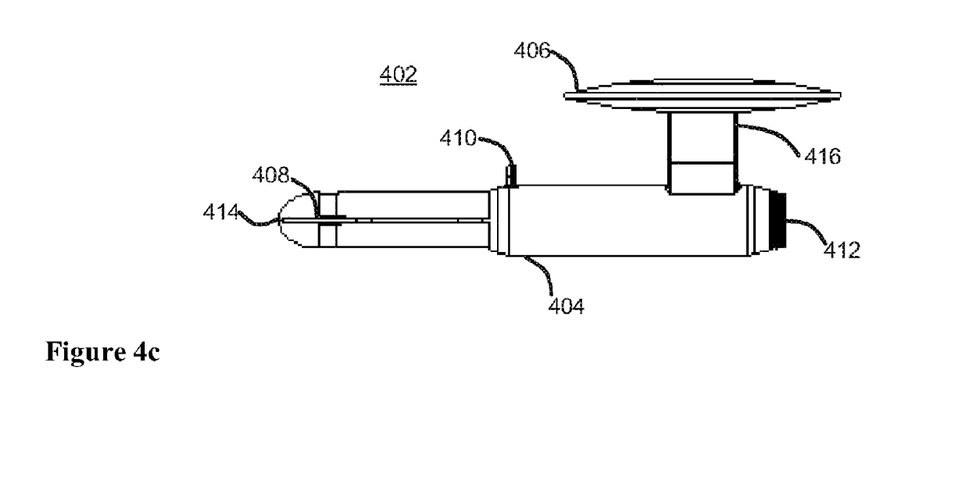
FIG. 4c illustrates a side view of one embodiment of an electronic fishing device in accordance with the present invention.

The control body 404, best shown in Figures from 4a to 4c, is preferably made of transparent acrylic tube with the bow piece, or substantial frontal part of the device, 414, battery cover (not shown) and fastener of the hydrofoil 416 made of die-casted plastic or some other feasible material. In the depicted example the control body 404 is substantially of cylindrical shape, i.e. a cylinder or "tube"-like. The control body 404 may include the electronics of the device (not shown) such as the first sensing means, the second sensing means, steering means and storage means. In one preferable embodiment the first sensing means and the second sensing means are implemented with the temperature and the pressure sensors configured to the same component or entity. The control of the electronic fishing device may be produced e.g. by a microcontroller. The display of the device is preferably an LCD (Liquid Chrystal Display) and controlling the device is enabled, for example, with one or more internal and/or at least partially surface mounted and watertight microswitches or e.g. push-buttons whereby e.g. a magnetic pencil or other tool may be applied for remotely, e.g. through the body 404 shell in the case of internal switch, controlling the device in order to minimize the possibility of water leaks via the switches/buttons upon activation, for instance. In addition, the control body 404 of the device includes a power source, typically e.g. two AAA batteries.

Figure 4D:
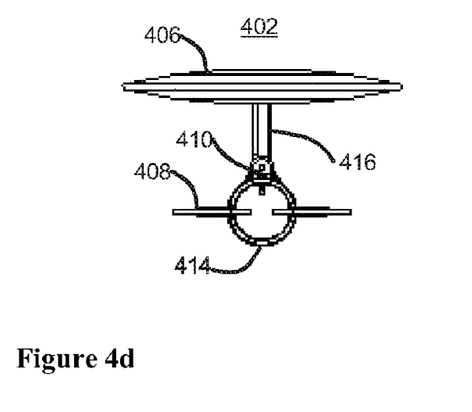
FIG. 4d illustrates a front view of one embodiment of an electronic fishing device in accordance with the present invention.
Figure 4E:
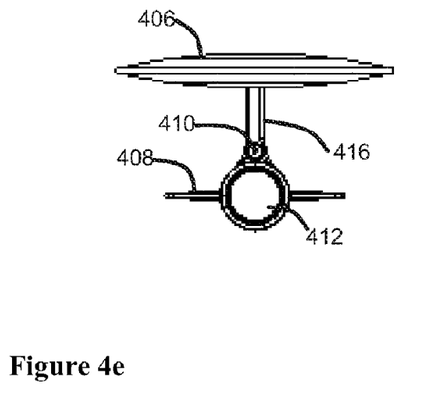
FIG. 4e illustrates a rear view of one embodiment of an electronic fishing device in accordance with the present invention.

With reference to FIGS. 4a and 4b as well as FIGS. 4d and 4e, the features of the front fins 408 will now be explained. The front fins 408 are preferably used to at least partially control the depth of the device 402 by changing the angle of attack of the hydrofoil. Typically, the control of the front fin angle is enabled e.g. with an actuation means such as a servo motor or an electromagnet (not shown). The device may be configured to detect the angle of the front fins by using the feedback coupling, for example, and to adjust the angle due to achieve and maintain desired depth in water. In another embodiment, the angle of the front fins can be set asymmetrically due to direct the device more alongside with the trolling vessel. In some embodiments, the front fins 408 may be implemented by using one large fin connected to above or below of the control body 404 or articulated to the centre or other desired portion of the control body 404.

With reference to Figures from 4a to 4e, the features of the hydrofoil 406 will now be explained. The function of the hydrofoil 406 is based on the shape of the hydrofoil's wing. Normally, the hydrofoils are used to raise the hull of a boat up and out of the water. As the effect of the boat speed, the hydrofoil creates the lift and at a certain speed, the lift produced by the hydrofoils is big enough to compensate the weight of the boat and its cargo. In this invention, the traditional hydrofoil is utilized upside down so as to help the device to dive.

The hydrofoil 406 is preferably placed above of the center of mass of the device 402 at the rear end of the control body 404. The place, the size and the shape of the hydrofoil 406 may have an effect of correcting a wrong intersecting angle and/or balancing the movement of the device 402 while steering the front fins 408 and/or while changing the towing direction. The balancing characteristics of the hydrofoil 406 are applicable to both low and high trolling speed.

The hydrofoil 406 is preferably made of buoyant material such as balsa, rotational molded plastic or acrylic, where the buoyancy characteristic may be enhanced by adding air bubbles therein. In one embodiment, the density of the hydrofoil is about 0.49 kg/m$^3$. The aim of the low density of the hydrofoil is to ensure the buoyancy of the device in case of loosing it, which leads finally to the stopping of the device, and to keep the device in the right position when it is laid down on the surface of water prior to initiation of actual trolling.

Different hydrofoils (shape, buoyancy, color) may be obtained and assembled for different purposes and circumstances as well as the preferences of the user.

Various shapes of the hydrofoil 406 may be especially appropriate for shallow water and for deep water, for example. Preferably, the hydrofoil shape is a disc shaped with a substantially elliptical cross sectional shape, for example. The other possible hydrofoil shapes may be similar to airfoil structures used in aircraft and to dagger-board used in sailing crafts; the usage position is then turned upside down in this invention. The other alternate shapes may be U-shaped, T-shaped and triangle shaped hydrofoils, for example. In the case of airfoil structures, the cross section of the hydrofoil is cambered with the mean-line concaved downwards when in use position. Instead, in the case of a dagger-board, the cross section is symmetrical.

Figure 5A:
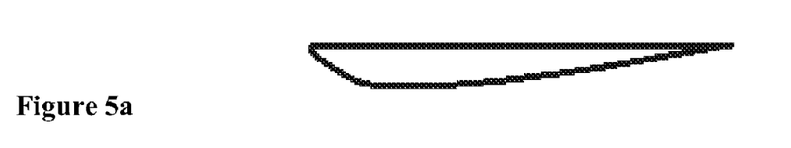
FIGS. 5a and 5b illustrate one alternative hydrofoil shape.
Figure 5B:
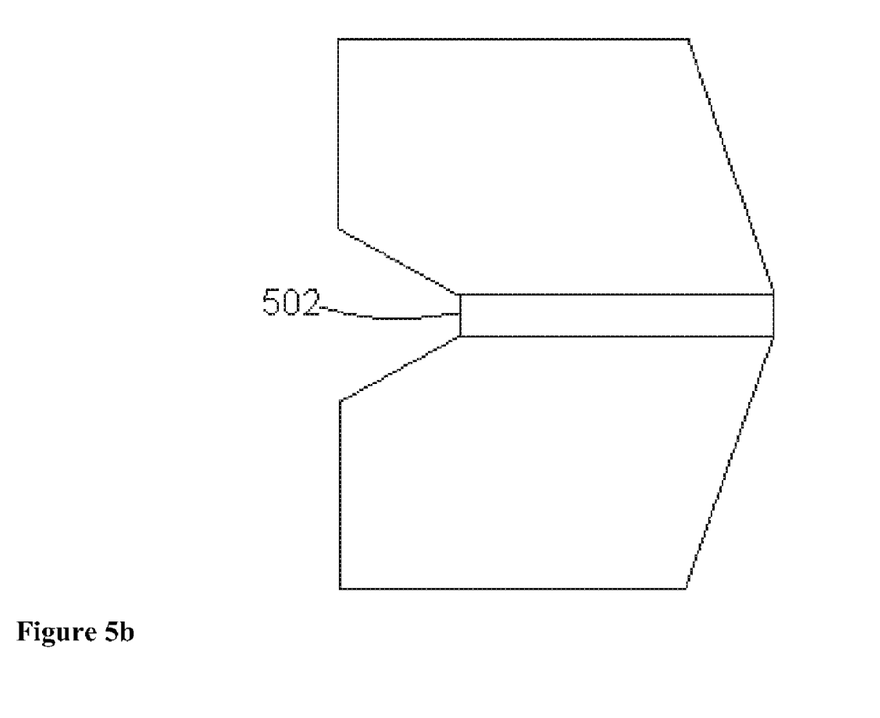

In FIGS. 5a and 5b one alternative hydrofoil shape for deep water are illustrated. For deep water, the hydrofoil 406 may have more wing profile to achieve more efficient diving force and to improve the movement of the device in deep water. The shape of this hydrofoil style resembles the U-shaped hydrofoil with an airfoil structure cross section. The opening 502 illustrated in the top view of FIG. 5b is turned on the direction of motion and the purpose of said opening is to give more space to the fishing line, for instance. However, in spite of the hydrofoil shape the buoyancy feature is preferably retained with every utilized shape.

Figure 6A:
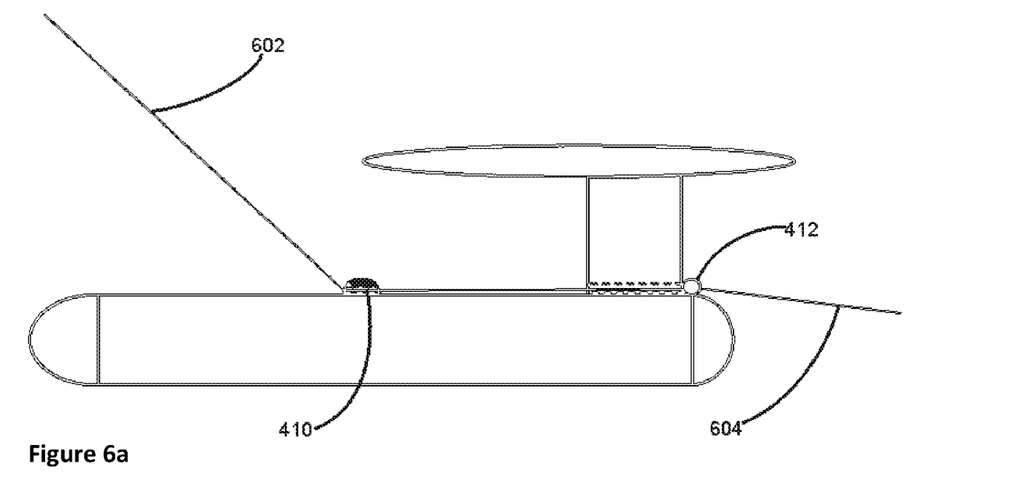
FIG. 6a illustrates a side view of one embodiment of an adjustable means to change the towing/trolling point location and a connection ring for a lure line.
Figure 6B:
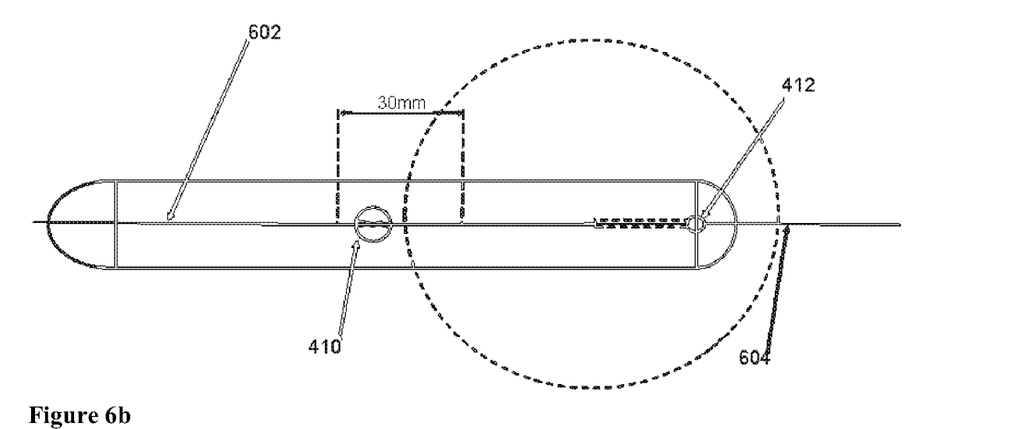
FIG. 6b illustrates a top view of one embodiment of an adjustable means to change the towing/trolling point location and a connection ring for a lure line.

FIGS. 6a and 6b illustrate one embodiment of an adjustable means to changing the towing/trolling point 410 location. A fishing line to the trolling rod is referred with number 602 and a line to the lure with 604. The advantages of the adjustable towing/trolling point 410 may come up while using lures of different weights, for example. Although the hydrofoil 406 balances the device 402 while trolling, the heavy lure may complicate the stabilization of the device. By adjusting the towing/trolling point 410 towards the back of the device the stability of the device is more effortless to achieve. With light lure the towing/trolling point 410 may be adjusted towards the front since the lighter lure affects the device 402 lesser.

In some advanced embodiments the towing/trolling point 410 may be, even dynamically, adjusted by the software. In this case, the software can be configured to detect the stabilization features depending on the weight of the lure and the trolling speed and to adjust the towing/trolling point 410 automatically to the adequate point.

Figure 7A:
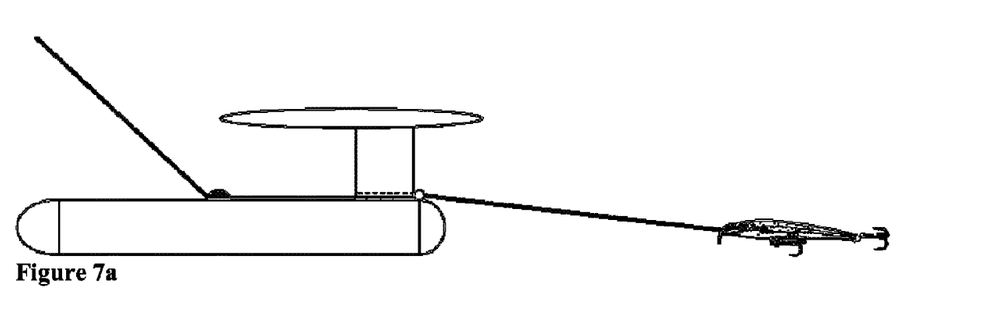
FIG. 7a illustrates a side view of one possible use scenario of an embodiment of the present invention.

FIG. 7a illustrates one possible use scenario of an embodiment of the present invention. The device 402 is connected from the trolling point to the rod with a line portion 602. The lure is connected to the connection ring 412 for the lure line of the device with a line portion 604. The portions 602, 604 may belong to the same, e.g. variable width, line as illustrated, or they may be separate lines. In the former case, the line portion 604 may be made thicker such that it does not freely slide through the connection ring and therefore functionally maintains the lure and the device separate during trolling operation. In alternative embodiment, a single constant-width line may be used, in which case the lure may be kept distant from the device by adding a local widening means such as a knot or a clip to the line portion 604 located between the connection ring and the lure. Still in a further alternative, a tension means may be provided in connection with the trolling point and/or connection ring such that during trolling the tension keeps the lure physically separated from the device body. The line 604 from the device to the lure is advantageously set short, e.g. about 0.5-2 m thus the depth of the lure remains the same with the device and the breaking of the line is more unlikely. Anyway, if the line 602 between the rod and the device breaks, the device rises to buoy on the surface of water (i.e. the buoyancy of the device also compensates for the weight of the lure), since the velocity of the device decreases and finally drops to zero, as described above. When a single line extends between the fishing rod and the lure such that it substantially freely passes via the trolling and connection rings, the device may surface in the case the lure or the line 604 gets stuck resulting a stop in horizontal speed.

Figure 7B:
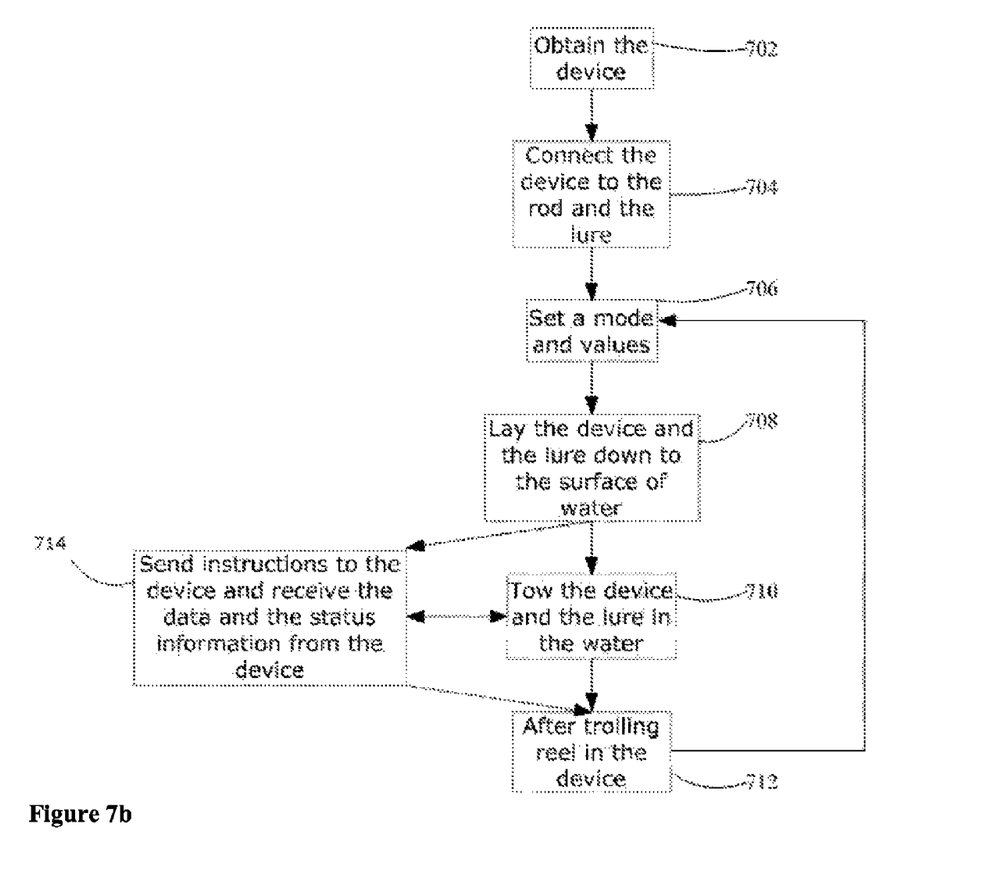
FIG. 7b presents a method diagram of one possible use scenario of an embodiment of the present invention.

Accordingly, FIG. 7b illustrates one possible method diagram of an embodiment of the present invention. Phase 702 refers to obtaining the device. In phase 704 the device is connected to the rod and the lure. In phase 706 the settings are adjusted and a desired trolling mode is selected. Next, see phase 708, the device is laid to the surface of the water and the trolling will be started. In phase 710 the towing of the device and the lure is performed. In the final phase 712 the device is reeled in and picked up from the water upon catching a fish or quitting fishing, for example. Dotted line from/to phase 714 refers to the optional data transmission between the device and the user via the remote control.

Figure 8:
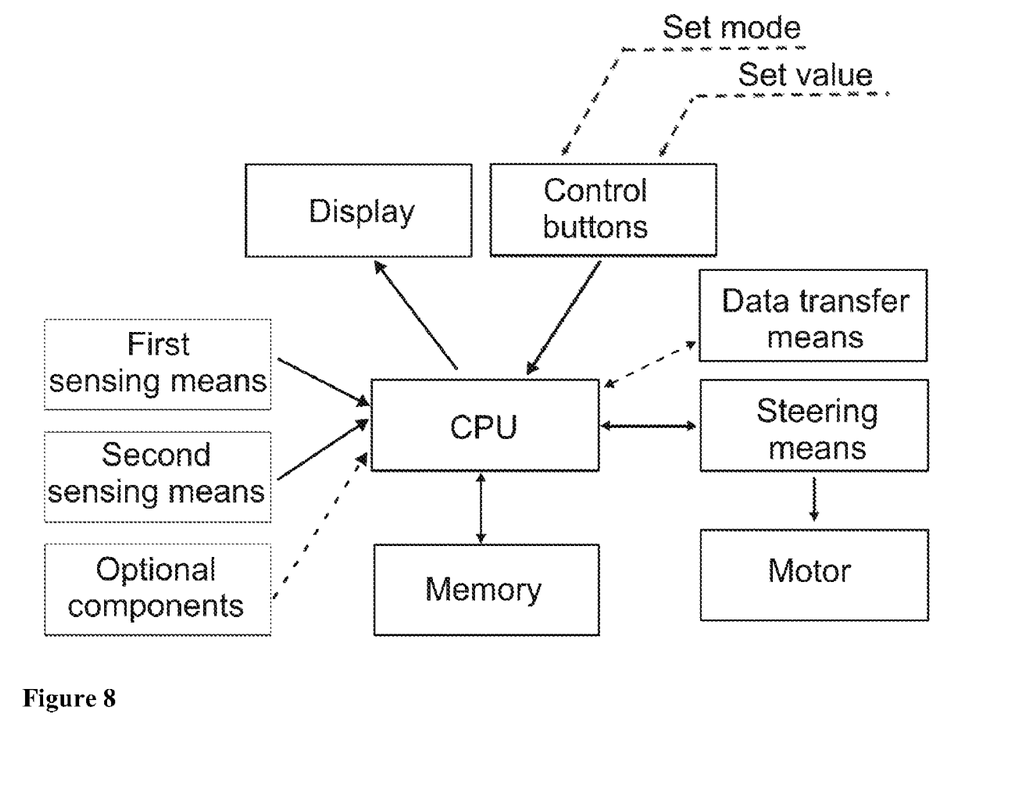
FIG. 8 is a block diagram of an embodiment of fishing device internals according to the present invention.

FIG. 8 is a block diagram of an embodiment of the electronic fishing device internals according to the present invention. The depicted example introduces certain internals of the device mainly from a functional standpoint and the actual implementations may vary, i.e. various elements may be physically integrated together or separated into multiple entities. The mode and the values for the CPU (Central Processing Unit) may be adjusted by the user via the control buttons. The steering means provide information about the fin position for CPU and the CPU controls the steering means, which controls the motor of the fin position, for example. The first sensing means, the second sensing means and the optional supplementary components provide the data that the CPU reads at intervals. The read data is stored to the memory as well as the settings and the programs of the device, e.g. preprogrammed routines. The instructions and information for the user may be presented on the display. Optionally, the display may be a touch display for obtaining control information from the user. The optional data transfer means provides two-way communications between the user and the device.

The second sensing means is preferably a pressure sensor that provides the indication of the depth by using e.g. the formula of hydrostatic pressure $P=\rho g h$, where $\rho$ is the liquid density, g is gravitational acceleration and h is the height of liquid above, as known as depth hereafter. Normally, since the approximated depth is satisfactory, the constants $\rho$ and g may be set according to freshwater density $1.00 \cdot 10^3$ kg/m$^3$ and standard gravity 9.80665 m/s$^2$. However, the constant g may be set depending on the position of the device on Earth and respectively, the constant $\rho$ may be set depending on water density according to the environment the device produced for, since the density of the salty sea water is greater than freshwater.

Figure 9:
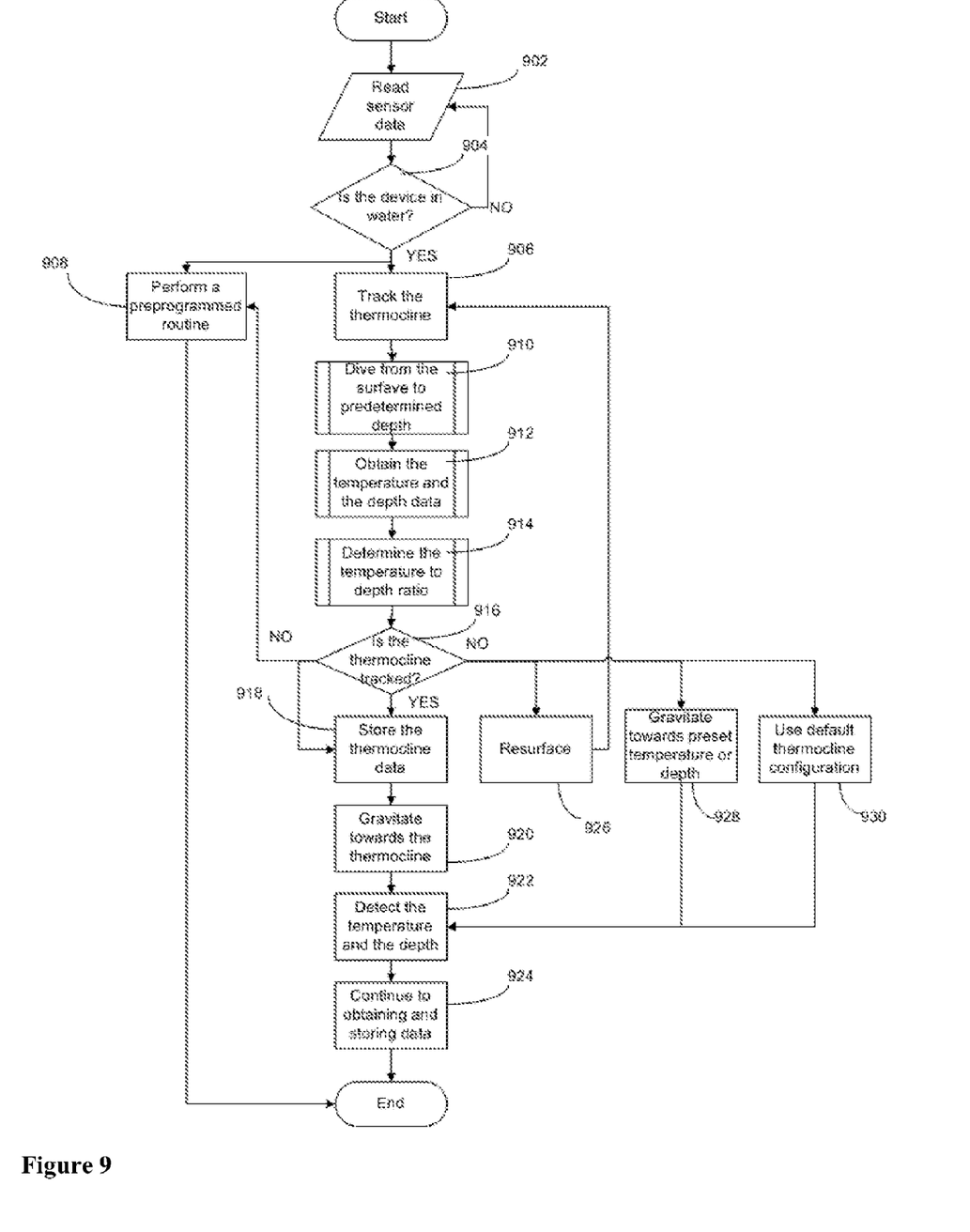
FIG. 9 presents a flow diagram of the functional description of the thermocline tracking and associated device steering and/or depth control.

With reference to FIG. 9, the actual functional description of the thermocline tracking and associated device steering and/or depth control may be introduced by software, for example.

At first, the processing means may be optionally configured to deduce, note reference numeral 904, based on the information sent by the sensing function at 902 that the device is laid down to the surface of water. Depending on the settings set by the user the processing means may be configured to at least track the thermocline 906, perform the preprogrammed routine 908, dive to a preset depth and/or temperature or wait for the instructions sent by the user via the data transfer means. It will be apparent to those skilled in the art that the processing means may be configured to send the information about its state to a remote device in any phase.

If the thermocline tracking is selected, the processing means may be configured to scan the area from the surface e.g. to 20 m or some other predetermined depth, or e.g. to the depth the user sets via the data transfer means 910. Alternatively, a predetermined range may be utilized within which the thermocline is supposed to reside. Instead of scanning the area downwards from the surface, the scanning procedure may also be performed from some particular depth upwards. Said processing means is configured to control the steering means to dive into the set depth. The scanning is performed to the set depth unless the optional bottom detection means detects the bottom of sea or a lake first, for example. In that case, said processing means is preferably configured to control the steering means to interrupt diving when the distance from the bottom is less than a predetermined value. During the scanning, the processing means is configured to read the temperature and/or depth data transmitted by the first sensing means and the second sensing means, respectively, with the sampling frequency of 10 times per second, for example, or with some other predetermined sampling frequency 912. The sampling frequency may also be determined by software depending on the sinking (vertical) and/or horizontal speed of the device, for instance. In addition, the data of the optional supplementary components may be read and during the scanning. The processing means is configured to calculate the average out of ten data points, i.e. the time period of one second, for instance, or out of some other predetermined data points and compare the data with the previous values 914. Further, said processing means is configured to store the data to the storing means. The data may also be sent to the remote device via the data transfer means.

The analyzed temperature to depth ratio $R=\Delta T/\Delta h$, is the average change of the temperature over the change of the depth. The ratio may also be the other way around, i.e. the depth to temperature ratio or some other relation with these or corresponding parameters such as associated tables, for instance. The thermocline is assumed to begin when the ratio exceeds the threshold value e.g. about 2-2.5 C/m and to end when the ratio again remains under the threshold value. In some other embodiments, the tracking of the thermocline may also be implemented with an algorithm that determines the upper and the lower border of the thermocline by detecting the change of the temperature derivative. The upper border is identified when the change of the derivative becomes near to about zero and, respectively, the lower border when the change of the derivative becomes negative. Thus the device may thus drift within the thermocline and remain therein without a more sophisticated scanning procedure. Note the FIG. 3, wherein three different acceleration points or areas have been highlighted and the acceleration term is used to refer to the aforesaid change of the temperature derivative.

After the area scanning has been performed said processing means may evaluate if the thermocline has been tracked 916. If the diving was interrupted, said processing means may use the data from the area scanned before the interruption. If the tracking of the thermocline has succeeded, said processing means is preferably configured to store the position of the thermocline layer in the storage means 918 and to control the steering means to rise to the preset level, e.g. layer, therein 920 or just to remain within the thermocline. Additionally, a preprogrammed routine may be performed in this phase 908. The processing means is configured to detect the environmental circumstances, e.g. the temperature and/or the depth, in the layer to control the steering means to stay within the layer/thermocline 922. Additionally, the processing means may be configured to perform the second scanning of the thermocline 906 or to wait for more instructions, for instance. Also, the processing means may be configured to continue the data reading and storing from the first sensing means and the second sensing means as well as from the optional supplementary devices 924.

If the tracking of the thermocline fails, the processing means may be configured to perform a preprogrammed routine 908 or a rescan 906. In case of rescanning said processing means controls the steering means to resurface 926 and starts the scanning again, for example. The sampling frequency and the averaging may also be adjusted for the rescanning, for instance. If the tracking of the thermocline fails, possibly again or repeatedly for a certain number of times, the processing means may be configured to control the steering means to dive or to rise to the preset temperature layer or to the preset depth 928 or to resurface 926. Alternatively, the processing means may be configured to use some default thermocline configuration 930 or to control the steering means to resurface 926. In some embodiments with the optional data transfer means, the device may be configured to send information to the remote device about the failing of the tracking and to wait the user's new instructions.

Further, the processing means may be configured to rescan the area 906 with predetermined time intervals or if e.g. the preset layer in the thermocline disappears. Alternatively, the instruction for the area scanning may be given by the remote controlling means. The area scanning 906 may also be performed after every resurface.

Moreover, the preprogrammed routine 908 performed before, after or instead of the thermocline tracking, for instance, may include some fish imitating movements or some other (pseudo-) random behavior to attract fish. In addition, the routine may be configured to control the device to set for a predetermined time period e.g. to a preset depth and/or temperature layer and switch the depth and/or the temperature layer periodically, for example.

Trolling may be finished by sending a termination request that is obtained by the device via the data transfer means, for instance, or simply by reeling in the fishing line that makes the device to resurface. The control means may be configured e.g. to recognize the forced rising attempt and to control the steering means to resurface.

In addition to or instead of fishing applications, the device in accordance with one or more embodiments of the present invention may be used for marine or other type of underwater research purposes. For example, the fish-catching element to be towed may be replaced with a measurement device and/or a sample gathering device or a measurement and/or a sample gathering devices may be included in the fish-catching element. Further, the measurement device and/or the sample gathering device may be configured to measure, for example, underwater light density and/or salinity to depth ratio or light intensity and/or salinity at various depths and/or to gather e.g. plankton samples. The measuring and/or sample gathering may be performed while tracking the thermocline and/or trolling or the measuring, and/or sample gathering may be performed by using e.g. some other preprogrammed routine or a remote control. The measured data may be further utilized when controlling the device and/or tracking the thermocline or performing some other procedures. In addition, the device may be configured to measure and/or gather samples continuously or the measuring and/or sample gathering may be user-adjustable, e.g. triggerable, and/or timed.

The scope of the patent will be defined by the appended claims. Skilled persons will appreciate the fact that various changes and modifications may be made to the explicitly disclosed embodiments and features thereof without diverging from the scope as set forth in the claims.

The invention claimed is:

1. An electronic fishing device for facilitating trolling a fish-catching element in water, said fishing device comprising:
   a first sensing means for obtaining a first indication relating to water temperature;
   a second sensing means for obtaining a second indication relating to a depth of the device;
   a steering means for adjusting the depth of the device;
   a position adjustment means for adjusting an angle of the device, when in use, and for stabilizing a movement thereof, wherein said position adjustment means, when in use position, comprises a reversed hydrofoil shape; and
   a processing means for controlling, via at least one of said first and second indication provided by said first and second sensing means, respectively, the steering means so as to guide the device relative to at least one element selected from a group consisting of: the position of a thermocline layer, a predetermined depth, and a predetermined temperature.

2. The device according to claim 1, wherein the device is configured to gravitate towards and remain within one of the thermocline layer in general, and to maintain a certain level relative to a predetermined distance according to one of a predetermined and adaptive criteria to the thermocline.

3. The device according to claim 1, comprising a body optionally including at least part of one of said processing means, first sensing means, and second sensing means.

4. The device according to claim 1, wherein said steering means includes at least one fin that is movable by an actuation means controlled by said processing means.

5. The device according to claim 1, wherein said position adjustment means comprises a buoyant material so as to facilitate the device to float in water.

6. The device according to claim 1, further comprising a remote controlling means comprises one of a receiver a transceiver for receiving information from a remote entity and a transceiver for receiving and transmitting information to and from the remote entity.

7. The device according to claim 1, further comprising a memory means for storing data.

8. The device according to claim 1, further comprising a sensor for detecting one of a bottom of a sea, a lake, and an other water reservoir.

9. The device according to claim 1, further comprising a camera.

10. The device according to claim 1, further comprising a sensor for measuring light intensity.

11. The device according to claim 1, further comprising one of a sideways trim and a sideways control means.

12. The device according to claim 1, wherein said device further comprises a plankton samples gathering device.

13. The device according to claim 1, wherein said device further comprises an underwater light intensity measuring device.

14. The device according to claim 1, wherein said device further comprises an underwater salinity measuring device.

15. The device according to claim 1, further comprising a towing means for attaching to a trolling line, comprising one of a hook and a ring, and an adjustment means for changing a location of a trolling means relative to a body of the device.

16. The device according to claim 1, further comprising a connection means, comprising one of a hook and a ring for attachment of a line having attached thereto at remote end one of a lure and another target entity the another target entity being one of a measurement and sample gathering device.

17. The system comprising an electronic fishing device as defined by claim 1, further comprising at least one element being remote therefrom, when in use, and selected from a group consisting of: a remote controller, a data analyzer, a data forwarding entity, and a data storage.

18. The system of claim 1, further comprising a line between said at least one element and said electronic fishing device for enabling data transfer between these two.

19. The electronic fishing device or system of claim 1, wherein the device is provided with multiple user-selectable modes, said multiple modes including a predetermined temperature tracking mode, a predetermined depth tracking mode, and a thermocline tracking mode.

20. A method of fishing by using device or system as defined by claim 1.

* * * * *